US009676455B2

(12) United States Patent
MacCready et al.

(10) Patent No.: US 9,676,455 B2
(45) Date of Patent: Jun. 13, 2017

(54) NAVIGATING DRIFTER

(71) Applicant: OCEAN LAB, LLC, Glendale, CA (US)

(72) Inventors: Tyler MacCready, Pasadena, CA (US); Anthony White, Los Angeles, CA (US)

(73) Assignee: Ocean Lab, LLC, Glendale, CA (US)

( * ) Notice: Subject to any disclaimer, the term of this patent is extended or adjusted under 35 U.S.C. 154(b) by 58 days.

(21) Appl. No.: 14/804,078

(22) Filed: Jul. 20, 2015

(65) Prior Publication Data

US 2016/0137271 A1 May 19, 2016

Related U.S. Application Data

(60) Provisional application No. 62/079,865, filed on Nov. 14, 2014, provisional application No. 62/081,133, filed on Nov. 18, 2014.

(51) Int. Cl.
| | |
|---|---|
| *B63B 22/18* | (2006.01) |
| *B63B 49/00* | (2006.01) |
| *B63H 5/15* | (2006.01) |
| *G05D 1/02* | (2006.01) |
| *G01P 5/06* | (2006.01) |
| *G01C 21/20* | (2006.01) |
| *G01S 19/14* | (2010.01) |

(Continued)

(52) U.S. Cl.
CPC .............. *B63B 22/18* (2013.01); *B63B 49/00* (2013.01); *B63H 5/15* (2013.01); *G01C 21/20* (2013.01); *G01P 5/02* (2013.01); *G01P 5/06* (2013.01); *G01S 19/14* (2013.01); *G01S 19/39* (2013.01); *G05D 1/0206* (2013.01); *B63B 2022/006* (2013.01)

(58) Field of Classification Search
CPC . B63B 22/003; B63B 2022/006; B63B 22/18; B63B 49/00; B63B 51/00; G05D 1/0206; G05D 1/0208; G01P 5/00; G01P 5/02; G01P 5/06; G01P 5/065; G01P 13/02; G01C 21/00; G01C 21/20; B63H 5/15; G01S 19/14
See application file for complete search history.

(56) References Cited

U.S. PATENT DOCUMENTS 4,145,921 A 3/1979 Blackwelder
4,408,488 A 10/1983 Marshall
(Continued)

FOREIGN PATENT DOCUMENTS

WO WO 2013/115761 A1 8/2013

OTHER PUBLICATIONS

International Search Report and Written Opinion for International Application No. PCT/US15/41172, mailed Oct. 9, 2015, 7 pages.
(Continued)

*Primary Examiner* — Ajay Vasudeva
(74) *Attorney, Agent, or Firm* — Lewis Roca Rothgerber Christie LLP

(57) ABSTRACT

A variable frontal area craft for performing drift measurements. The craft includes a variable frontal area mechanism and a propulsion assembly, and is configured to operate at least partially submerged in a liquid. The variable frontal area mechanism is configured to operate in a first, high frontal area state and in a second, low frontal area state.

17 Claims, 13 Drawing Sheets

(51) Int. Cl.
*G01P 5/02* (2006.01)
*G01S 19/39* (2010.01)
*B63B 22/00* (2006.01)

(56) References Cited

U.S. PATENT DOCUMENTS

| | | | |
|---|---|---|---|
| 5,007,285 A | 4/1991 | Dahlen et al. | |
| 5,091,892 A * | 2/1992 | Secretan | G10K 11/008 310/337 |
| 5,108,326 A * | 4/1992 | Seiler | B63B 22/18 114/122 |
| 5,283,767 A | 2/1994 | McCoy | |
| 5,363,343 A * | 11/1994 | Klein | G01V 1/201 114/21.3 |
| H1618 H | 12/1996 | Blume | |
| 5,602,801 A * | 2/1997 | Nussbaum | G01S 7/521 114/21.3 |
| 5,691,957 A | 11/1997 | Spiesberger | |
| 5,706,253 A * | 1/1998 | Nedderman, Jr. | G10K 11/008 367/153 |
| 6,093,069 A | 7/2000 | Schelfhout | |
| 6,507,793 B1 | 1/2003 | Zoccola, Jr. | |
| 6,745,979 B1 | 6/2004 | Chen | |
| 6,774,837 B2 | 8/2004 | Barrick et al. | |
| 7,148,416 B1 | 12/2006 | Rice | |
| 7,190,637 B2 | 3/2007 | Evans et al. | |
| 7,666,045 B2 * | 2/2010 | Nigel | B63B 22/18 114/244 |
| 8,274,861 B1 | 9/2012 | Marn et al. | |
| 9,487,282 B2 * | 11/2016 | Dufour | B63G 8/18 |
| 2003/0071751 A1 | 4/2003 | Barrick et al. | |
| 2010/0135122 A1 | 6/2010 | Rhodes et al. | |
| 2010/0185348 A1 | 7/2010 | Webb | |
| 2010/0302901 A1 | 12/2010 | Welker et al. | |
| 2011/0041754 A1 | 2/2011 | Grabe et al. | |
| 2011/0076904 A1 | 3/2011 | Richter-Menge et al. | |
| 2011/0226174 A1 | 9/2011 | Parks | |
| 2012/0095629 A1 | 4/2012 | Fjellstad et al. | |
| 2013/0289870 A1 | 10/2013 | Schwartz et al. | |
| 2015/0367938 A1 * | 12/2015 | Zambrano | B64C 39/024 244/50 |

OTHER PUBLICATIONS

MacCready, Tyler, "Multiscale Vorticity from a Swarm of Drifters," Ocean Lab, IEEE/OES Eleventh Current, Waves and Turbulence Measurement (CWTM), pp. 1-6, Mar. 2, 2015.

* cited by examiner

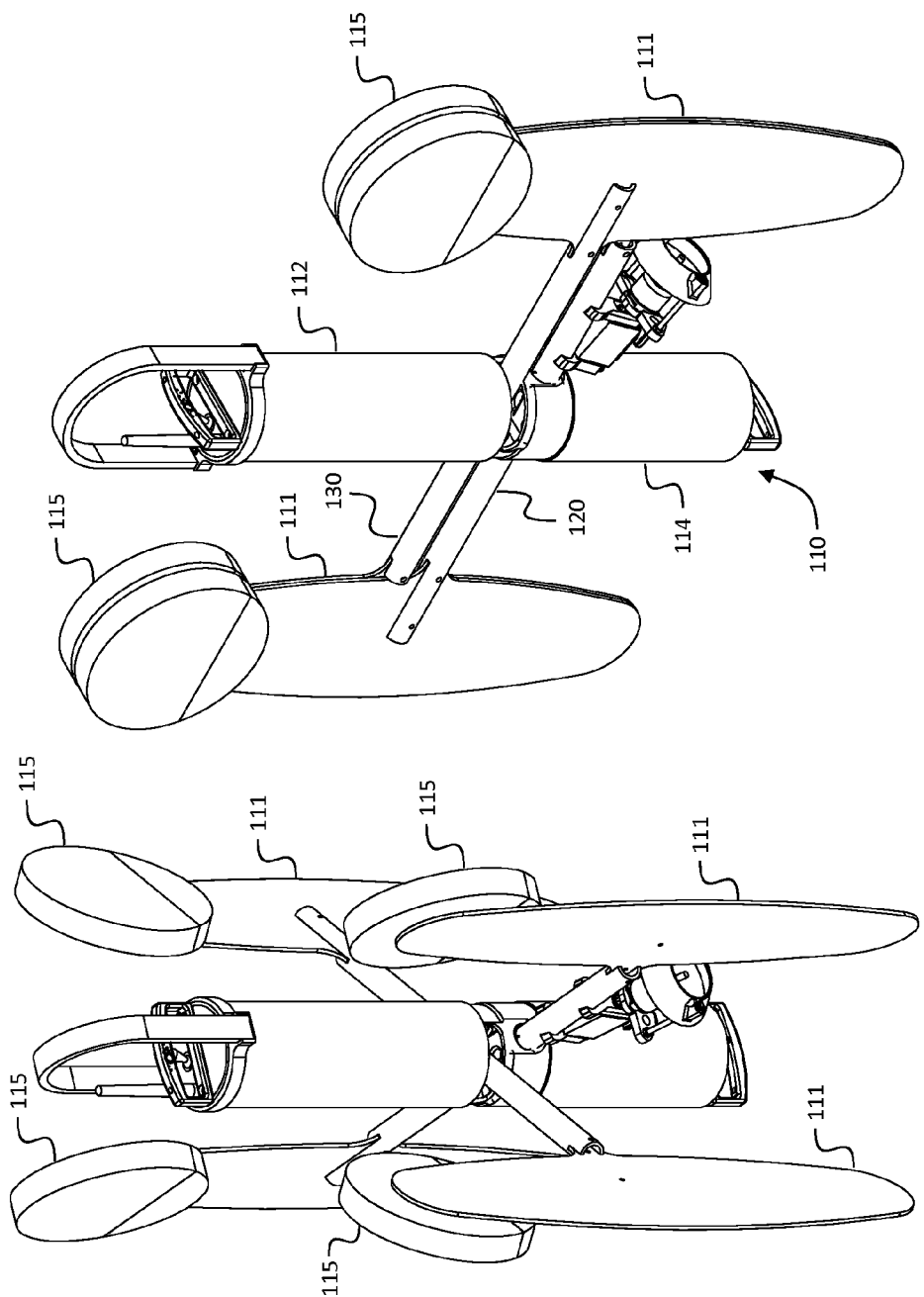

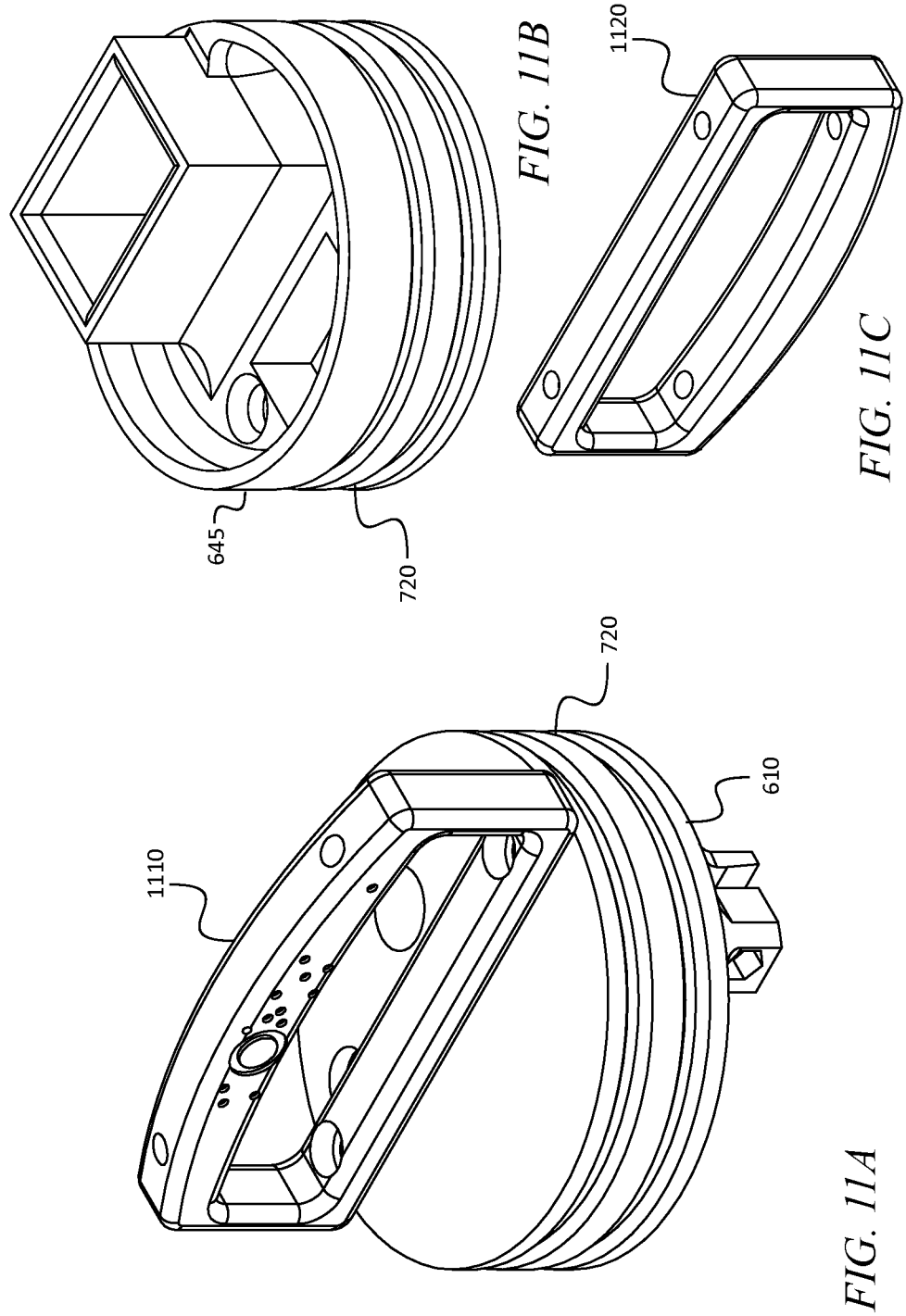

NAVIGATING DRIFTER

CROSS-REFERENCE TO RELATED APPLICATION(S)

The present application claims priority to and the benefit of U.S. Provisional Application No. 62/079,865, filed Nov. 14, 2014, entitled "GROUP OF TRANSFORMING DRIFTERS", the entire content of which is incorporated herein by reference, and the present application claims priority to and the benefit of U.S. Provisional Application No. 62/081,133, filed Nov. 18, 2014, entitled "GROUP OF TRANSFORMING DRIFTERS", the entire content of which is incorporated herein by reference.

FIELD

One or more aspects of embodiments according to the present invention relate to drifters, and more particularly to a drifter that may be configured to operate either in a fluid-tracking state or a fluid-transiting state.

BACKGROUND

Drifters may be used to track currents in a moving liquid, such as the ocean. To maximize tracking accuracy, a drifter may be designed to maximize drag, particularly in a horizontal direction. This may be accomplished by making the drifter in a shape with a large frontal area when viewed from any lateral direction. The large frontal area creates a large drag that resists motion of the drifter through the liquid so that the drifter accurately moves with the current. A large submerged drag area also minimizes the influence of unwanted motion induced by other factors such as the force of wind on parts of the drifter exposed above the surface. An ocean drifter may be passive, without means for self-propulsion.

On the other hand, self-propelled vehicles, such as boats or autonomous underwater vehicles (AUVs), may be designed to minimize drag so that they can travel efficiently through the liquid. This may be particularly important for battery-powered vehicles for which energy may be limited, and in which drag may directly impact travel speed and total travel distance. A primary way to minimize drag on a device is to minimize its frontal area. AUVs may be a means for gathering oceanographic data. Such vehicles may be used to carry sensors and imaging equipment. However, a low-drag vehicle may be ill-suited for the high-drag requirement of a device for gathering accurate drift measurements. Thus, there is a need for a device that has the mobility of a vehicle and the accurate current measurement capability of a drifter.

SUMMARY

Aspects of embodiments of the present disclosure are directed toward a variable frontal area craft for performing drift measurements. The craft includes a variable frontal area mechanism and a propulsion assembly, and is configured to operate at least partially submerged in a liquid. The variable frontal area mechanism is configured to operate in a first, high frontal area state, and alternately in a second, low frontal area state.

According to an embodiment of the present invention there is provided a variable frontal area craft, including: a propulsion assembly; and a variable frontal area mechanism, the craft being configured to operate at least partially submerged in a liquid, the variable frontal area mechanism configured to operate in: a first state; and a second state, a minimum frontal area of the craft being greater in the first state than in the second state.

In one embodiment, the minimum frontal area of the craft in the first state is at least three times as great as the minimum frontal area of the craft in the second state.

In one embodiment, the variable frontal area mechanism includes two fins, the fins being substantially perpendicular in the first state, and the fins being substantially parallel in the second state.

In one embodiment, the craft includes: a fixed crossbar; a first fin at a first end of the fixed crossbar; and a second fin at a second end of the fixed crossbar; and a pivoting arm including: a pivoting crossbar; a first fin at a first end of the pivoting crossbar; and a second fin at a second end of the pivoting crossbar, the fixed arm being rigidly secured to a central body of the craft, and the pivoting arm being configured to pivot about an axis parallel to a plane of the fins of the pivoting arm and parallel to a plane of the fins of the fixed arm.

In one embodiment, the craft includes an actuator configured to rotate the pivoting arm to effect a transition from the first state to the second state, or from the second state to the first state.

In one embodiment, the actuator is configured to repeatedly effect transitions between the first state and the second state.

In one embodiment, the actuator is a gearmotor.

In one embodiment, the craft includes: a mechanical stop to engage the pivoting arm and to prevent the pivoting arm from rotating by more than 90 degrees; and a circuit to drive the gearmotor, the circuit and the gearmotor being configured to avoid damage to the craft and to the gearmotor when the pivoting arm engages the mechanical stop.

In one embodiment, the central body includes a sealed enclosure having: an upper compartment above the fixed crossbar and the pivoting crossbar; and a lower compartment below the fixed crossbar and the pivoting crossbar, the upper compartment being rigidly secured to the lower compartment by two tubular conduits.

In one embodiment, the craft includes a battery in the lower compartment.

In one embodiment, the craft includes a Global Positioning System (GPS) receiver, a compass, and an inertial measurement unit in the upper compartment.

In one embodiment, the propulsion assembly includes a thrust mechanism capable of producing a thrust force and a steering mechanism capable of causing the craft to turn.

In one embodiment, the thrust mechanism includes a propulsion motor coupled to a propeller, and a nozzle surrounding the propeller.

In one embodiment, the steering mechanism includes a servo coupled to the thrust mechanism.

In one embodiment, the craft includes a compass.

In one embodiment, the craft is capable of following a compass heading.

In one embodiment, the craft is capable of measuring a local vorticity.

In one embodiment, the craft includes a Global Positioning System (GPS) receiver, the craft being capable of navigating to a set geographic location according to GPS coordinates of the location.

In one embodiment, the craft is capable of measuring a surface velocity of the liquid.

In one embodiment, the craft includes a reflector, the craft being configured to support the reflector above the surface of the liquid.

BRIEF DESCRIPTION OF THE DRAWINGS

These and other features and advantages of the present invention will be appreciated and understood with reference to the specification, claims, and appended drawings wherein:

FIG. 2A is a perspective view of a drifter in an intermediate state, according to an embodiment of the present invention;

FIG. 2B is a perspective view of a drifter in a fluid-transiting state, according to an embodiment of the present invention;

FIG. 11A is a perspective view of a top cap with a top cap handle, according to an embodiment of the present invention;

FIG. 11B is a perspective view of a lower cap, according to an embodiment of the present invention;

FIG. 11C is a perspective view of a lower cap handle, according to an embodiment of the present invention;

Figure 12B:
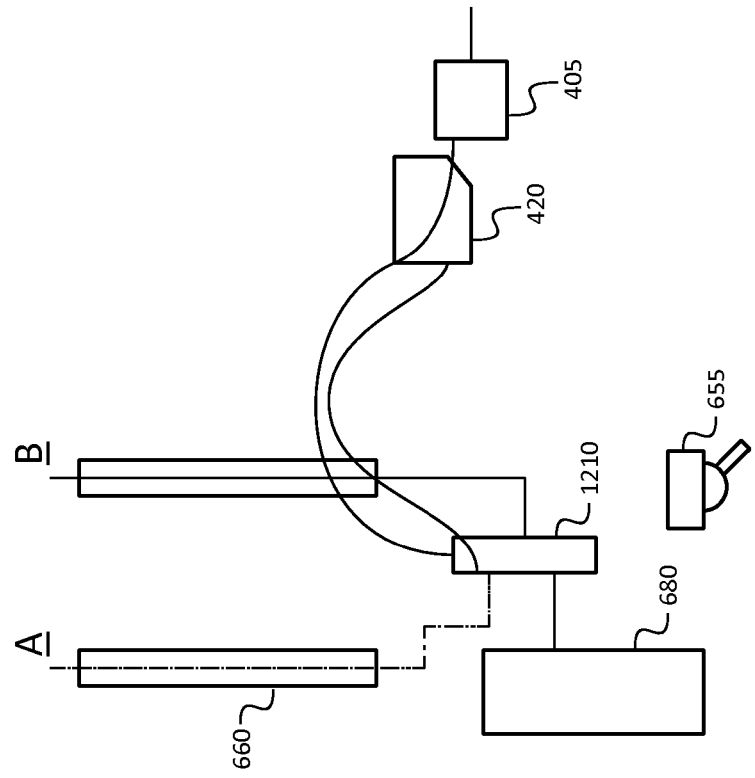
FIG. 12B is a block diagram of the lower portion of the electrical system of a drifter, according to an embodiment of the present invention.
Figure 12A:
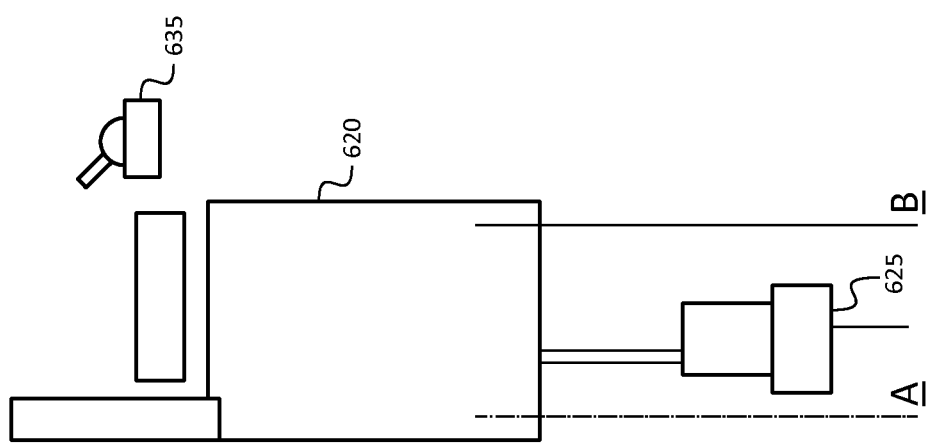
FIG. 12A is a block diagram of the upper portion of the electrical system of a drifter, according to an embodiment of the present invention.

Except for FIGS. 12A and 12B, drawings herein are to scale, for one embodiment. The scale used may vary between drawings.

DETAILED DESCRIPTION

The detailed description set forth below in connection with the appended drawings is intended as a description of exemplary embodiments of a navigating drifter provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
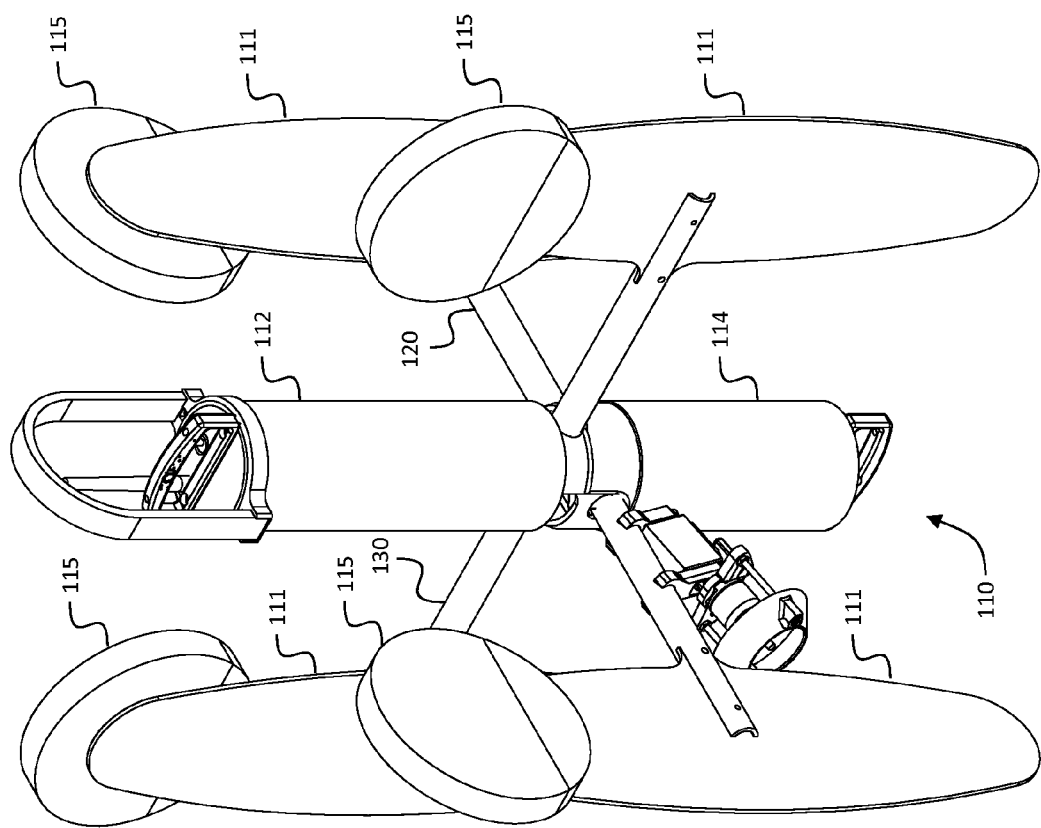
FIG. 1 is a perspective view of a drifter in a fluid-tracking state, according to an embodiment of the present invention.

Referring to FIG. 1, in one embodiment a floating vessel or craft referred to herein as a "drifter" includes a central body 110 and two arms, each arm including two fins 111. The central body 110 includes an upper compartment 112 and a lower compartment 114. One of the arms is a fixed arm 120, secured substantially immovably to the central body 110, and the other is a pivoting arm 130, which is configured to pivot through an angle of approximately 90 degrees about a longitudinal axis of the central body 110. A float 115 is secured to the top of each fin 111, so that if the drifter is placed in a body of water such as an ocean, a river, or a lake, the drifter will float in a stable attitude, with the central body 110 and the four fins 111 substantially vertical, the floats 115 partially submerged, and most of each fin 111 submerged.

In the configuration of FIG. 1, the fins 111 of the fixed arm 120 are substantially perpendicular to those of the pivoting arm 130, so that the drifter has a large frontal area and the coefficient of drag of the drifter is high for motion in any direction parallel to the surface of the water. This configuration or first state of the drifter may be referred to as the high-drag state or "fluid-tracking" state of the drifter. When the fins 111 are in the high-drag state, the velocity of the drifter relative to the water may be small, even in the presence of external forces such as wind, because of the high drag provided by the fins 111. In this state the drifter therefore tracks the water, i.e., it moves with a velocity substantially equal to the surface velocity of the water.

Figure 3C:
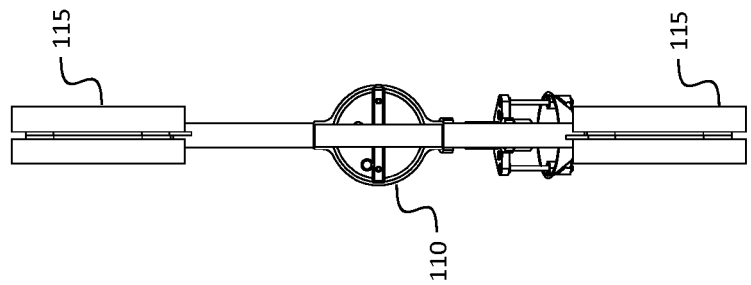
FIG. 3C is a top view of a drifter in the fluid-transiting state, according to an embodiment of the present invention.
Figure 3B:
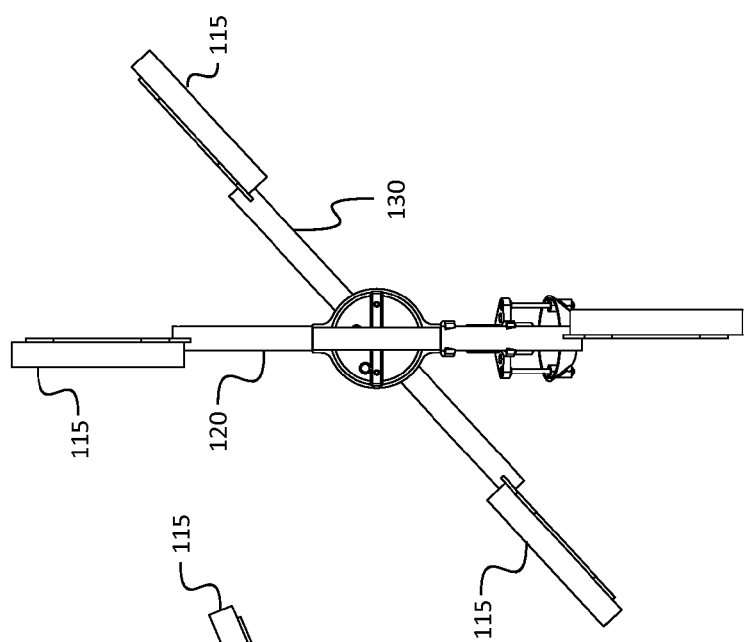
FIG. 3B is a top view of a drifter in an intermediate state, according to an embodiment of the present invention.
Figure 3A:
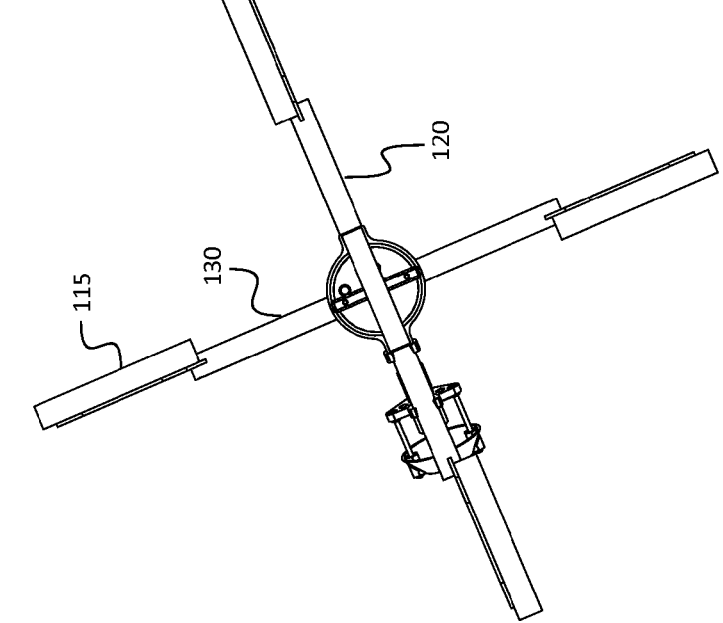
FIG. 3A is a top view of a drifter in the fluid-tracking state, according to an embodiment of the present invention.

The pivoting arm 130 may rotate, as mentioned above, through the intermediate state of FIG. 2A, and fold into a second state which is a closed, low-drag, or "fluid-transiting" state, shown in FIG. 2B. In the fluid-transiting state, each fin 111 of the pivoting arm 130 is adjacent to, and parallel to, a fin 111 of the fixed arm 120, so that the coefficient of drag of the drifter in a direction parallel to the fins 111 is reduced. FIGS. 3A-C show, from a top view, the transition from the fluid-tracking state (FIG. 3A) through the intermediate state (FIG. 3B) to the fluid-transiting state (FIG. 3C). In one embodiment, the drifter has a mass of about 8.5 pounds, external dimensions of about 24"×24"×19" in the fluid-tracking state, and external dimensions of about 3.3"×24"×19" in the fluid-transiting state.

Figure 4:
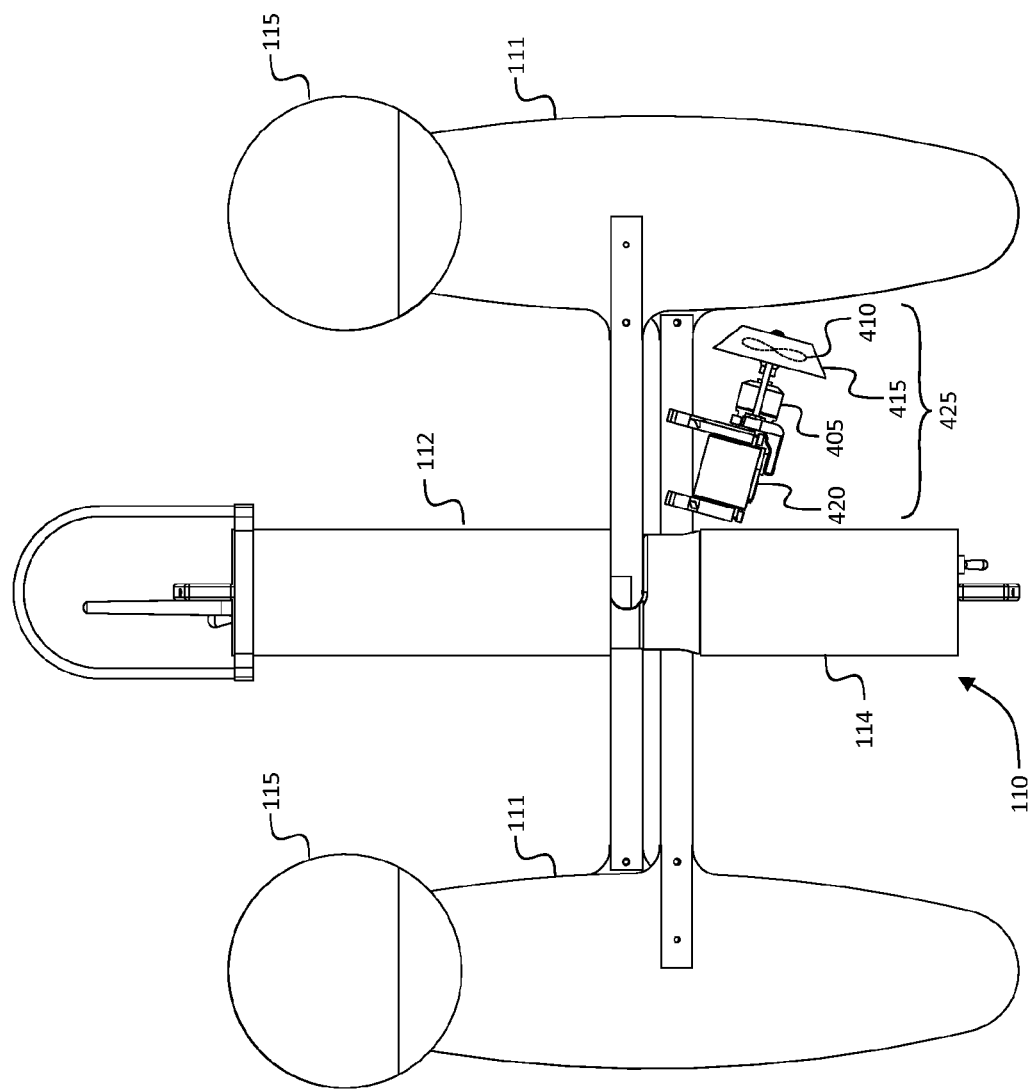
FIG. 4 is a side view of a drifter in the fluid-transiting state, according to an embodiment of the present invention.
Figure 5C:
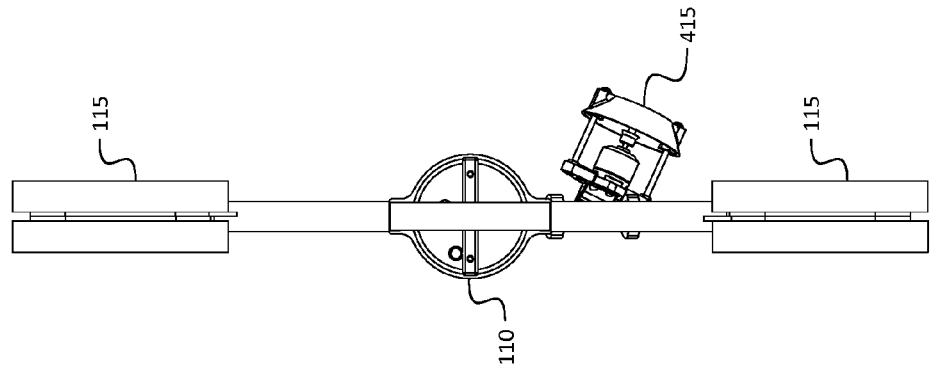
FIG. 5C is a top view of a drifter in the fluid-transiting state with the thrust assembly rotated right, according to an embodiment of the present invention.
Figure 5B:
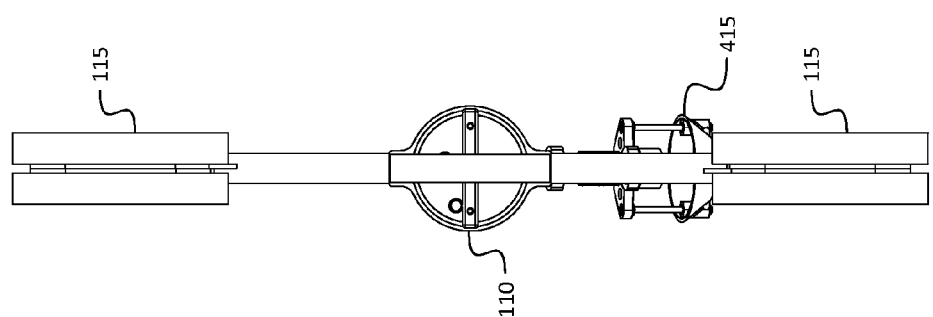
FIG. 5B is a top view of a drifter in the fluid-transiting state with the thrust assembly centered, according to an embodiment of the present invention.
Figure 5A:
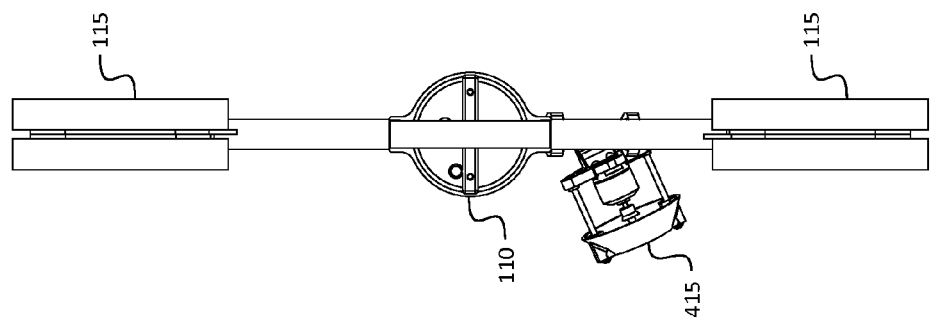
FIG. 5A is a top view of a drifter in the fluid-transiting state with a thrust assembly rotated left, according to an embodiment of the present invention.

FIG. 4 is a side view of the drifter in the fluid-transiting state. A thrust assembly, including a propulsion motor 405 (e.g., a model A2212 motor, available from Amazon (amazon.com)) that drives a propeller 410 that turns inside a Kort nozzle 415, provides a thrust force to propel the drifter through the water. The propeller 410 may be a nylon fiberglass, 40 mm diameter, 3-blade propeller 410. The propulsion assembly 425 may include the propulsion motor 405, the propeller 410 and the Kort nozzle 415, and a steering actuator or "rudder servo" 420 that rotates the thrust assembly to the left (FIG. 5A), or to the right (FIG. 5C), or centers it (FIG. 5B). The rudder servo 420 may be a waterproof (e.g., International Protection Rating 68 (IP68)) servo motor (e.g., a HiTec 32646W servo, available from eBay (ebay.com)). When the thrust assembly is rotated to the left or to the right (as in FIGS. 5A and 5C), the line of action of the thrust force does not pass through the center of drag of the drifter and accordingly results in a torque causing the drifter to rotate. In other embodiments, the drifter is steered through the action of another steering mechanism. For example, the thrust assembly may be fixed, and the steering mechanism may be a rudder used to steer the drifter. In another example, the drifter may have two thrust assemblies, e.g., side by side, and the steering mechanism may include a provision (e.g., two respective motor speed control circuits, or two respective propeller pitch control mechanisms) for varying the relative thrust generated by the two thrust assemblies. In some embodiments, an M100 motor, available from Blue Robotics (bluerobotics.com), is used as the propulsion motor 405, or a T100 thruster, also available from Blue Robotics, is used as the thrust assembly, in place of the propulsion motor 405, the Kort nozzle 415, and the propeller 410 illustrated in FIG. 4. As used herein, the "frontal area" of the drifter refers to the area of the drifter projected onto a plane perpendicular to a direction of motion parallel to the surface of the water. The "minimum frontal area" is the frontal area for a direction of motion, parallel to the surface of the water, for which the frontal area is smallest.

Figure 6:
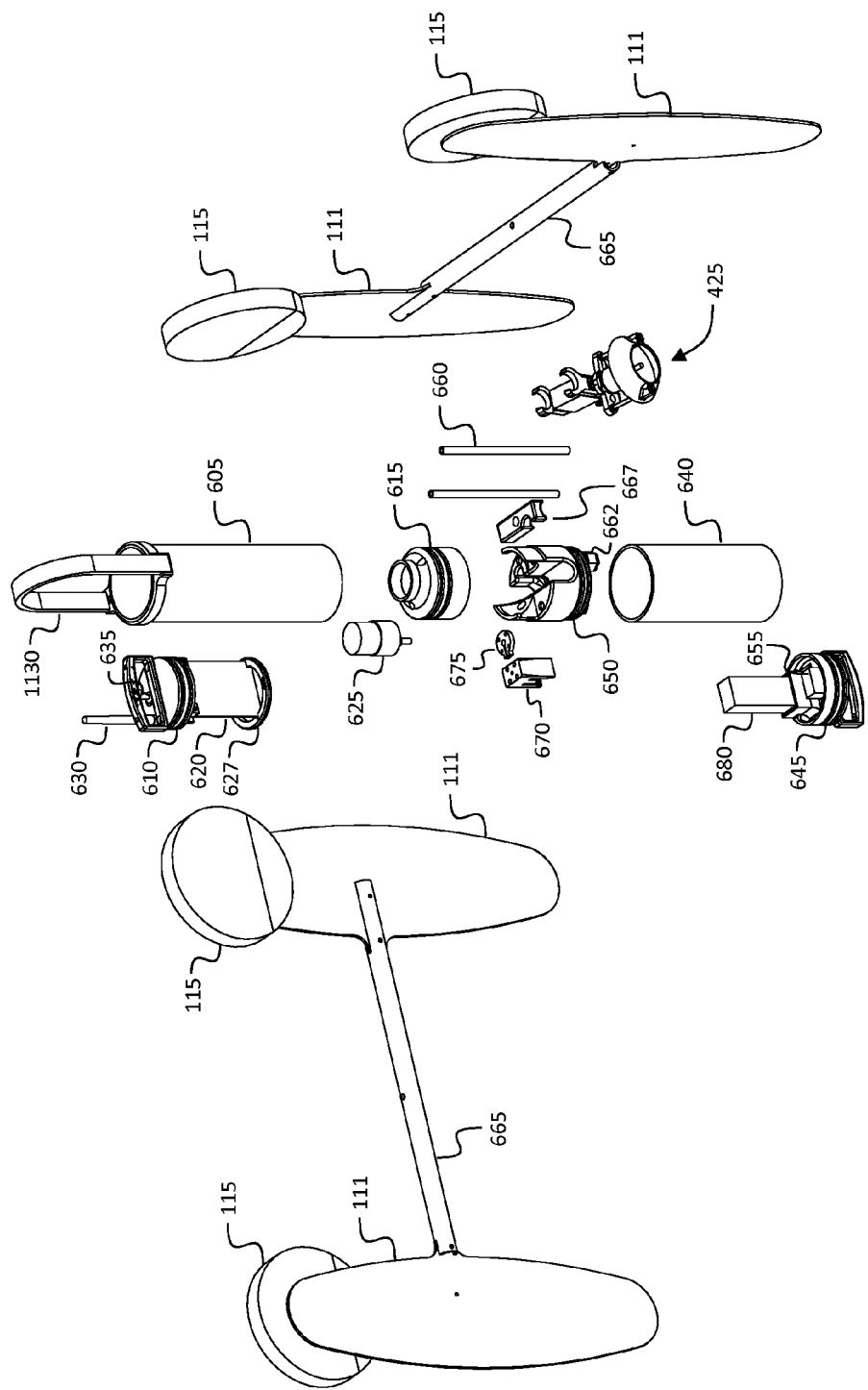
FIG. 6 is an exploded perspective view of a drifter, according to an embodiment of the present invention.

Referring to FIG. 6, in one embodiment the upper compartment 112 includes an upper tube 605, sealed at the top by a top cap 610 and at the bottom by the upper half 615 of a central core. The upper compartment 112 contains the system electronics circuit 620 and a gearmotor 625. A status LED ring mount diffuser 627 supports the lower end of the system electronics circuit 620 and acts as a diffuser so that a status light emitting diode (LED) on the system electronics circuit 620 may be visible from a broad range of directions. A radio antenna 630 extends through the top cap 610, as does a manual fold/unfold switch 635. The radio antenna 630 may be sealed to the top cap 610 with a silicone-based sealant. The lower compartment 114 includes a lower tube 640 sealed at the bottom by a lower cap 645 and at the top by the lower half 650 of the central core. The lower compartment 114 contains a rechargeable or "secondary" battery 680. A power switch 655 extends through the lower cap 645.

The top half of the central core and the lower half 650 of the central core are joined by two conduits 660, which may be fiberglass reinforced plastic tubes (e.g., sections of tube having an outside diameter of 5/16 inch, available from Amazon (amazon.com), and sold for use in free-standing tents), the lower end of each of which may be secured, and sealed, to the lower half 650 of the central core, by a respective conduit cable gland 662 (e.g., a number M16 cable gland available from McMaster-Carr (mcmaster.com) with part number 1013N11). The upper end of each conduit 660 may be bonded into a corresponding conduit bore 820 (FIG. 8A) in the upper half 615 of the central core. The upper half 615 of the central core and the lower half 650 of the central core thus form a rigid central core assembly. The upper tube 605 and lower tube 640 may be composed of polycarbonate and may be clear to facilitate inspection of the interior of each compartment, e.g., for leaks. Each arm may include a tubular member or "crossbar" 665, and two fins 111, each equipped with two floats 115.

Figure 7B:
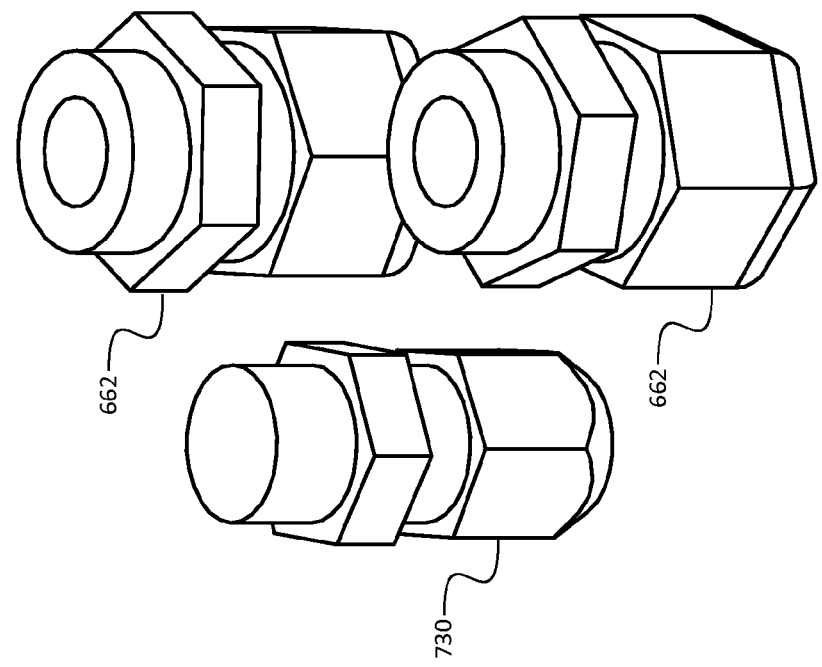
FIG. 7B is a perspective view of three cable glands, according to an embodiment of the present invention.
Figure 7A:
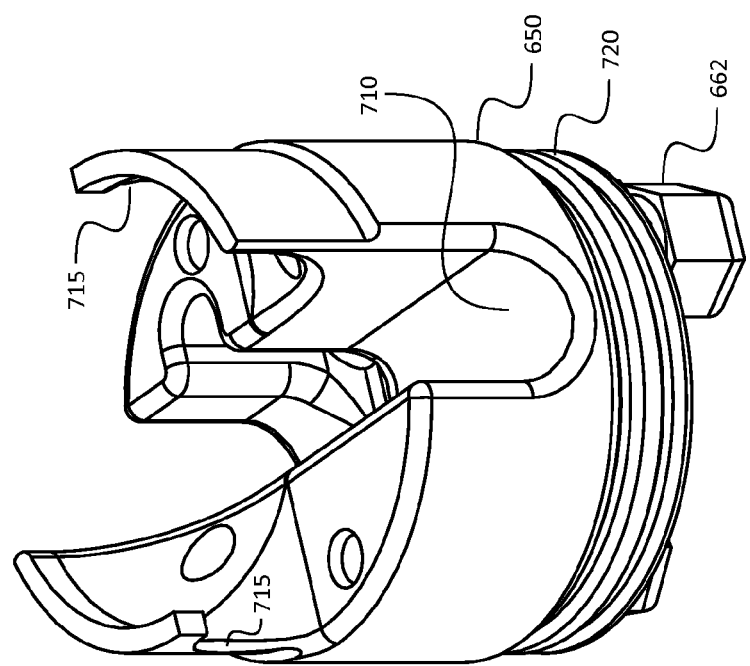
FIG. 7A is a perspective view of a central core lower half, according to an embodiment of the present invention.

Referring to FIG. 7A, a U-shaped channel 710 in the lower half 650 of the central core is configured to receive the crossbar 665 of the fixed arm 120, which is secured by a pivot base insert 667 (FIG. 6), a part with a concave lower surface configured to engage the curved surface of the crossbar 665. The lower half 650 of the central core further includes two pivot arm stops 715 for preventing the pivoting arm 130 from rotating more than about 90 degrees from the fixed arm 120. Two O-ring grooves 720 accommodate O-rings that seal the lower half 650 of the central core to the lower tube 640. FIG. 7B shows the two conduit cable glands 662, and a propulsion cable gland 730 that provides a sealed path out of the lower compartment 114 for a cable running to the propulsion assembly 425.

Figure 8C:
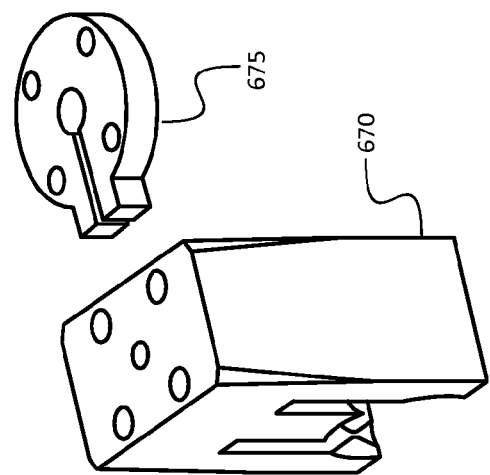
FIG. 8C is a perspective view of a shaft coupling clamp and a crossbar pivot mount, according to an embodiment of the present invention.
Figure 8B:
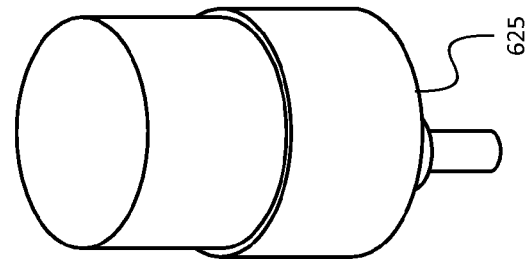
FIG. 8B is a perspective view of a gearmotor, according to an embodiment of the present invention.
Figure 8A:
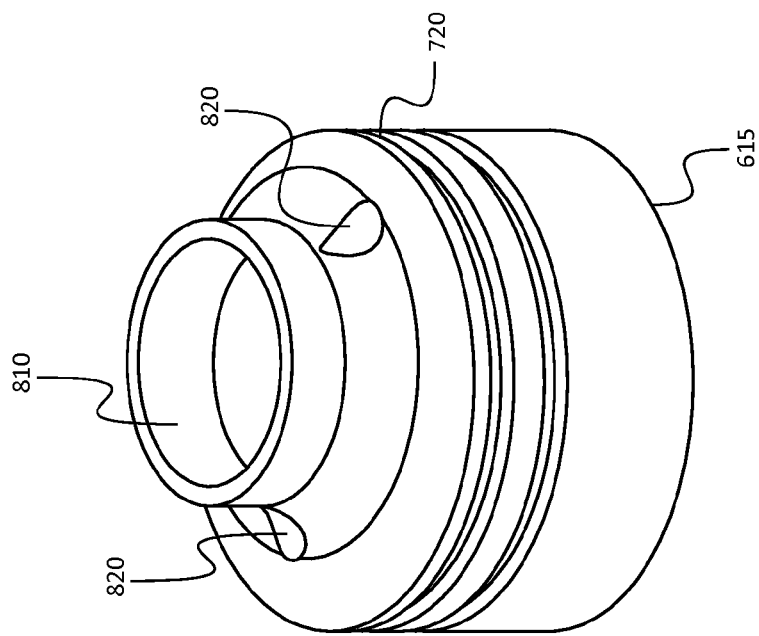
FIG. 8A is a perspective view of a central core upper half, according to an embodiment of the present invention.

Referring to FIGS. 8A-C, the upper half 615 of the central core (FIG. 8A) also includes O-ring grooves 720 to accommodate O-rings that seal the upper half 615 of the central core to the upper tube 605. The upper half 615 of the central core further includes a motor housing bore 810 that accommodates and secures the gearmotor 625; the output shaft of the gearmotor 625 (FIG. 8B) extends through a motor shaft bore in the upper half 615 of the central core. The motor shaft bore includes an internal groove for a shaft seal that allows the gearmotor 625 shaft to extend out of the sealed volume of the upper compartment 112 and to rotate without breaking the seal of the upper compartment 112. The gearmotor 625 is connected to the pivoting arm 130 by a shaft coupling clamp 675 (FIG. 8C) that is clamped to the output shaft of the gearmotor 625, and that is also secured, by four threaded fasteners, to a crossbar pivot mount 670 that is in turn clamped to the crossbar 665 of the pivoting arm 130.

Figure 9:
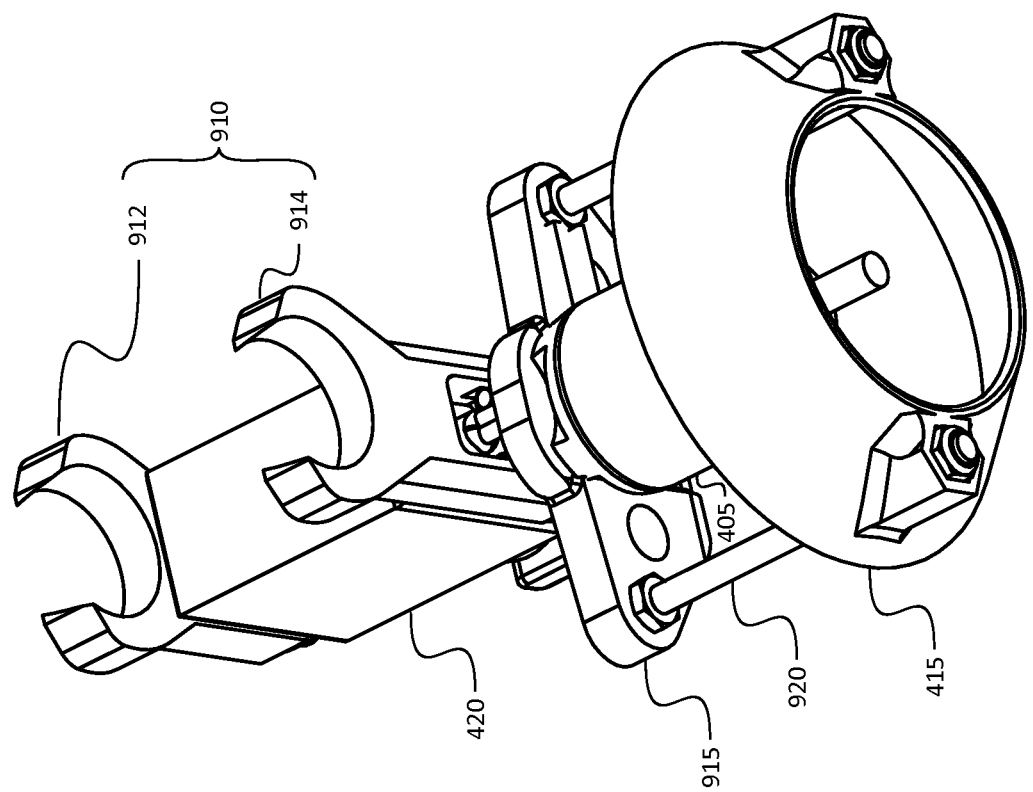
FIG. 9 is a perspective view of a propulsion assembly, according to an embodiment of the present invention.

Referring to FIG. 9, the propulsion assembly 425 includes a two-piece propulsion assembly mount 910 including a front servo mount 912 and a rear servo mount 914 that are secured to the front and rear, respectively, of the rudder servo 420 and each of which snaps on to the crossbar 665 of the fixed arm 120. A propulsion motor bracket 915 is secured to the output arm of the rudder servo 420 and clamps the propulsion motor 405, securing it to the rudder servo 420. The propulsion motor bracket 915 further accommodates two 3 mm threaded rods 920 that extend parallel to the propulsion motor 405, to support the Kort nozzle 415 at the rear of the propulsion motor 405.

Figure 10:
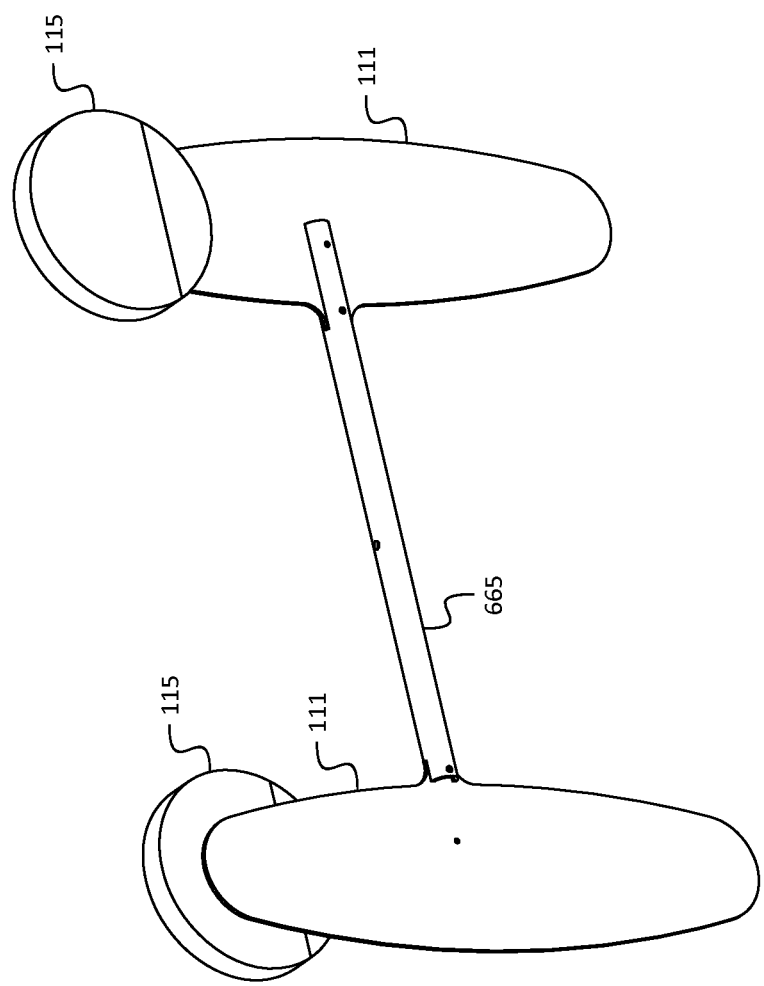
FIG. 10 is a perspective view of an arm, according to an embodiment of the present invention.

Referring to FIG. 10, the pivoting arm 130 may include the crossbar 665, two fins 111, and two floats 115. Each crossbar 665 may be fabricated from a length of suitable tubing, e.g., ½ inch polyvinyl chloride pipe. Each fin 111 may be cut from a suitably stiff panel material, such as fiberglass reinforced plastic (e.g., FR4), corrugated acrylonitrile butadiene styrene (ABS), or carbon-fiber reinforced plastic. Each fin 111 may be 3/16 inch thick. Each fin 111 may be sufficiently stiff that deformation of the fins 111 (which, if it occurs, may absorb energy that otherwise would cause motion of the entire drifter) is small. The height, width, and shape of the fins 111 may be selected so that the frontal area of the drifter in the fluid-tracking state is about 3 times as great as the frontal area of the drifter in the fluid-transiting state. In other embodiments, the fins 111 are rectangular and extend inward to nearly contact the central body 110, and the frontal area of the drifter in the fluid-tracking state is about 10 times as great as the frontal area of the drifter in the fluid-transiting state.

A float 115 may be secured (e.g., with an adhesive such as SciGrip Acrylic Adhesive 16™), to each fin 111. Each float 115 may be fabricated by slicing a suitable thickness (e.g., ½ inch) of material from an 8 inch diameter cylinder of closed cell polyethylene foam or closed cell ethylene vinyl acetate (EVA) foam. The buoyancy of the central body 110 and the size of the floats 115 may be selected to provide adequate stability when the drifter is floating, and to allow the antennas to extend above the surface of the water, without exposing an unacceptably large area to wind forces. In one embodiment the central body 110 and each of the floats 115 extends between 3 and 5 inches above the surface when the drifter is floating. Each float 115, or the upper half of each float 115, may be painted, e.g., painted white, to improve the visibility of the drifter in operation. Each fin 111 may be secured to a respective crossbar 665 with two threaded fasteners, one near an edge of the fin 111 nearest the central body 110, and another near the center of the fin 111.

Each fin 111 may have an "inside" surface and an "outside" surface, according to whether the surface faces toward or away from a fin 111 on the other arm in the fluid-transiting state. The arms may lack protrusions (e.g., portions of crossbars 665 or floats 115) on the inside surfaces of the fins 111, so that they may be folded into a fluid-transiting state in which each fin 111 is in contact with, or nearly in contact with, another fin 111, reducing the drag in the fluid-transiting state. For example, the crossbar 665 may have a longitudinal cut with a width approximately equal to the thickness of the fin 111, into which the fin 111 fits when assembled, and the crossbar material may be removed over most of the portion of the crossbar 665 overlapping the fin 111, at the inside surface of the fin 111. Similarly, each float 115 may be secured to the outside surface of a respective fin 111.

Figure 11D:
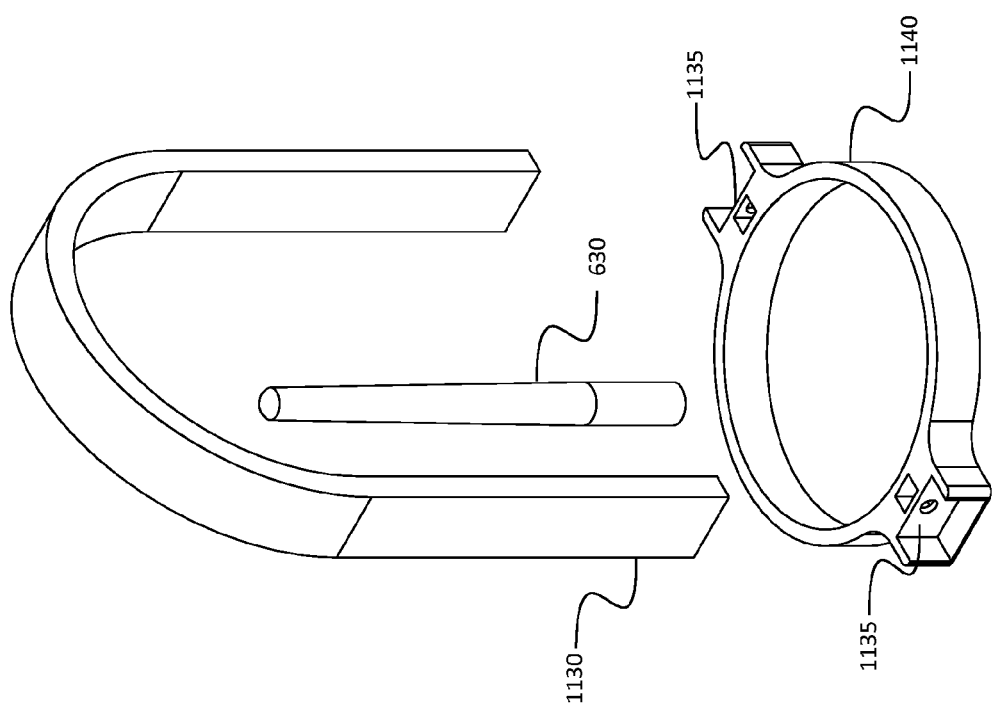
FIG. 11D is a perspective view of a launch and retrieval handle, a radio antenna, and a launch and retrieval handle bracket, according to an embodiment of the present invention.

Referring to FIGS. 11A-C, the top of the upper tube 605 and the bottom of the lower tube 640 may be sealed by a top cap 610 and a lower cap 645, each of which may have two O-ring grooves 720 to accommodate O-rings for sealing the respective compartments. A top cap handle 1110 and a bottom cap handle 1120 may be secured to the top cap 610 and the lower cap 645, respectively, to facilitate removing or installing the top cap 610 and the lower cap 645. FIG. 11D shows a launch and retrieval carrying handle 1130, which may be a ½ inch by ⅛ inch strip of rubber, each end of which is secured with a threaded fastener to a respective mounting point 1135 on a launch and retrieval handle bracket 1140 that is bonded to the upper tube 605 (not shown in FIG. 11D).

Several components of the drifter may be composed of a suitable polymer, e.g., ABS, and may be fabricated by three-dimensional (3D) printing, including the top cap 610, the lower cap 645, the upper half 615 of the central core, the lower half 650 of the central core, the propulsion assembly mount 910, the Kort nozzle 415, and the propulsion motor bracket 915. In other embodiments these components may be fabricated by other methods, e.g., by injection molding. ABS parts such as the launch and retrieval handle bracket 1140 may be bonded to the polycarbonate upper tube 605 with an adhesive such as Oatey all-purpose cement sold by Oatey (oatey.com).

Referring to FIGS. 12A and 12B, in one embodiment the electrical system of the drifter includes system electronics circuit 620, the gearmotor 625, the battery 680, a propulsion assembly control board 1210, the rudder servo 420, the propulsion motor 405, the fold/unfold switch 635, and the power switch 655. The circuitry of FIG. 12A is connected to the circuitry of FIG. 12B at the points labeled A and B, respectively. The conduits 660 are shown schematically in FIG. 12B. The system electronics circuit 620 includes a microcontroller board (e.g., a Teensy 3.0 board, available from PJRC (pjrc.com)) configured to accept a Secure Digital™ (SD™) card, an inertial measurement unit (IMU) and compass (e.g., a MiniIMU-9 v3 IMU, available from Pololu (pololu.com), including both an IMU and a compass), a Global Positioning System (GPS) receiver (e.g., an Ultimate GPS board, available from adafruit (adafruit.com)), a buzzer (e.g., a 70 dB buzzer, available from Digi Key (digikey.com), with part number 102-115-ND), an H-bridge motor driver (e.g., an SN 754410 motor driver, available from Pololu (pololu.com)), and a point-to-point radio (e.g., a 900 MHz XBee module, available from Digi Key (digikey.com)). The buzzer may provide an audible tone when either (i) the GPS receiver is not locked, or (ii) the SD™ card is not installed on the microcontroller board. All of these components may be installed on a system board, a printed circuit board that may include connectors for the components, connectors for external components such as the gearmotor 625 and the propulsion motor 405, and power conditioning components such as capacitors.

The battery 680 may be a 23 watt-hour, 11.1 V lithium ion battery 680 (e.g., a Venom model 3S battery 680, available from Amazon (amazon.com)). The propulsion assembly control board 1210 may include servo control electronics for the rudder servo 420 and an electronic speed control (ESC) for the propulsion motor 405. The ESC may also provide a supply of power at 5 V for powering several of the components of the electronics circuit 620.

The power switch 655 may extend through the lower cap 645, and may be used to shut off system power. The fold/unfold switch 635 may extend through the top cap 610 and be used to fold or unfold the drifter, overriding the control of the system electronics circuit 620. The power switch 655 and the fold/unfold switch 635 may be IP68 switches (e.g., a CW202-ND and a CW209 switch, respectively, available from Digi Key (digikey.com)). The power switch 655 and the fold/unfold switch 635 may be sealed to the top cap 610 and to the lower cap 645, respectively, with a silicone-based sealant. Whether under the control of the system electronics circuit 620 or of the fold/unfold switch 635, the gearmotor 625 may stall when the pivoting arm 130 reaches one of the stops; the drive voltage and gearmotor 625 may be selected so that the motor stalls instead of causing mechanical damage to the drifter, and so that the stall current is sufficiently low to avoid damaging the drive electronics or overheating the gearmotor 625.

In operation, a plurality of drifters may be deployed and may operate under the control of a central controller. Each drifter may determine its position and heading from the GPS receiver and from the IMU and compass, and report this information to the central controller, or record the position and heading as a function of time. This capability may allow the drifter, when in the fluid-tracking state, to characterize the velocity and the local vorticity of the water, the local vorticity being measured, for example, by the rotation of the drifter as sensed by the compass. The central controller may, depending on the test campaign planned and the locations of the drifters, command one or more drifters to transition to the fluid-transiting state and navigate to new positions, to redistribute the drifters spatially or when a test has been completed and a new test is to begin, or when the drifters are being marshalled at one location at the end of a test campaign.

In the fluid-transiting state, the drifter may estimate its position and heading from the GPS receiver, the compass, and the IMU, and it may be able to navigate to a set geographic location, e.g., when commanded to do so by the central controller. The drifter may carry a reflector (e.g., an optical retroreflector or a sheet of retroreflective material, or a radar retroreflector) to make it possible for a central controller with a suitable illumination source and detector to locate the drifter by its reflections.

Although exemplary embodiments described herein relate to measurement of velocities on the surface of a body of water, the invention is not limited thereto. The embodiments described herein may be deployed to float in a variety of fluids. Moreover, drifters may be constructed according to the principles described herein and enhanced (e.g., with buoyancy control) to move in three dimensions within a fluid, and they may be employed in a variety of circumstances and a variety of fluids. Miniaturized drifters may be used, for example, to characterize fluid flows in artificial or natural enclosed fluid systems.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially", "about", and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items, means at least half of the items.

As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of", when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use", "using", and "used" may be considered synonymous with the terms "utilize", "utilizing", and "utilized", respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein.

Although exemplary embodiments of a navigating drifter have been specifically described and illustrated herein, many modifications and variations will be apparent to those skilled in the art. Accordingly, it is to be understood that a navigating drifter constructed according to principles of this invention may be embodied other than as specifically described herein. The invention is also defined in the following claims, and equivalents thereof.

What is claimed is:

1. A variable frontal area craft, comprising:
   a propulsion assembly; and
   a variable frontal area mechanism,
   the craft being configured to operate at least partially submerged in a liquid,
   the variable frontal area mechanism configured to operate in:
      a first state; and
      a second state,
   a minimum frontal area of the craft being greater in the first state than in the second state,
   wherein the variable frontal area mechanism comprises:
      a fixed arm comprising:
         a fixed crossbar;
         a first fin at a first end of the fixed crossbar; and
         a second fin at a second end of the fixed crossbar; and
      a pivoting arm comprising:
         a pivoting crossbar;
         a first fin at a first end of the pivoting crossbar; and
         a second fin at a second end of the pivoting crossbar,
      the fixed arm being rigidly secured to a central body of the craft, and the pivoting arm being configured to pivot about an axis parallel to a plane of the fins of the pivoting arm and parallel to a plane of the fins of the fixed arm, wherein the fins of the fixed arm are substantially perpendicular to the fins of the pivoting arm in the first state, and wherein the fins of the fixed arm and the fins of the pivoting arm are substantially parallel in the second state.

2. The craft of claim 1, further comprising an actuator configured to rotate the pivoting arm to effect a transition from the first state to the second state, or from the second state to the first state.

3. The craft of claim 2, wherein the actuator is configured to repeatedly effect transitions between the first state and the second state.

4. The craft of claim 3, wherein the actuator is a gearmotor.

5. The craft of claim 4, further comprising:
a mechanical stop to engage the pivoting arm and to prevent the pivoting arm from rotating by more than 90 degrees; and
a circuit to drive the gearmotor,
the circuit and the gearmotor being configured to avoid damage to the craft and to the gearmotor when the pivoting arm engages the mechanical stop.

6. The craft of claim 1, wherein the central body comprises a sealed enclosure having:
an upper compartment above the fixed crossbar and the pivoting crossbar; and
a lower compartment below the fixed crossbar and the pivoting crossbar,
the upper compartment being rigidly secured to the lower compartment by two tubular conduits.

7. The craft of claim 6, further comprising a battery in the lower compartment.

8. The craft of claim 7, further comprising a Global Positioning System (GPS) receiver, a compass, and an inertial measurement unit in the upper compartment.

9. The craft of claim 1, wherein the propulsion assembly comprises a thrust mechanism capable of producing a thrust force and a steering mechanism capable of causing the craft to turn.

10. The craft of claim 9, wherein the thrust mechanism comprises a propulsion motor coupled to a propeller, and a nozzle surrounding the propeller.

11. The craft of claim 9, wherein the steering mechanism comprises a servo coupled to the thrust mechanism.

12. The craft of claim 1, further comprising a compass.

13. The craft of claim 12, wherein the craft is capable of following a compass heading.

14. The craft of claim 12, wherein the craft is capable of measuring a local vorticity.

15. The craft of claim 1, further comprising a Global Positioning System (GPS) receiver, the craft being capable of navigating to a set geographic location according to GPS coordinates of the location.

16. The craft of claim 15, wherein the craft is capable of measuring a surface velocity of the liquid.

17. The craft of claim 1, further comprising a reflector, the craft being configured to support the reflector above the surface of the liquid.

* * * * *